United States Patent
Kronfeld et al.

(10) Patent No.: US 8,344,933 B1
(45) Date of Patent: Jan. 1, 2013

(54) SYSTEM AND METHOD FOR AIRCRAFT COMMUNICATIONS

(75) Inventors: Kevin M. Kronfeld, Cedar Rapids, IA (US); Daniel L. Woodell, Cedar Rapids, IA (US); Roy E. Robertson, Marion, IA (US); Venkata A. Sishtla, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 12/895,426

(22) Filed: Sep. 30, 2010

(51) Int. Cl.
*G01S 7/36* (2006.01)

(52) U.S. Cl. ....................... 342/25 R; 375/244

(58) Field of Classification Search ............... 342/26; 375/244

See application file for complete search history.

(56) References Cited

U.S. PATENT DOCUMENTS

| | | | |
|---|---|---|---|
| 2003/0102997 A1* | 6/2003 | Levin et al. | 342/57 |
| 2006/0152403 A1* | 7/2006 | Wicks et al. | 342/25 R |
| 2007/0069943 A1* | 3/2007 | Adams et al. | 342/130 |
| 2009/0251358 A1* | 10/2009 | Becker et al. | 342/120 |
| 2010/0245162 A1* | 9/2010 | Krikorian et al. | 342/202 |
| 2010/0302093 A1* | 12/2010 | Bunch et al. | 342/26 B |
| 2010/0302094 A1* | 12/2010 | Bunch et al. | 342/26 D |

* cited by examiner

*Primary Examiner* — Timothy A Brainard
(74) *Attorney, Agent, or Firm* — Donna P. Suchy; Daniel M. Barbieri (57) ABSTRACT

A radar system has an antenna. The system includes electronics configured to facilitate communication using radar returns received and transmitted by the antenna. The electronics is configured to extract communications data from a received radar return. The electronics is further configured to provide communications data with an outgoing radar pulse for data transmission.

22 Claims, 7 Drawing Sheets

SYSTEM AND METHOD FOR AIRCRAFT COMMUNICATIONS

BACKGROUND

The present disclosure relates generally to the field of radar systems. More particularly, the disclosure relates to aircraft weather radar systems.

More than 3,000 aircraft equipped with automatic airborne radars are flying worldwide at any given time. Automated radars provide the pilot with a hands-free operating system that detects precipitation at a range of about 320 nautical miles ahead of the aircraft. Automatic radars have the capability to be programmed to scan specific areas of the atmosphere. They can be used to automatically scan areas where there are known gaps in the US and Global Radar detection network. In addition, they can be used in a net-centric manner to scan areas of the atmosphere that have the potential for severe weather. Scanning these areas may improve the radar scan updates for severe storms and potentially improve forecasting of the severe weather as well as shorten the forecast cycle. Improving forecasting of severe weather and shortening the forecast cycle may benefit aviation as well as ground based operations. Current and planned future aircraft densities may provide a dense network of airborne weather radar observation nodes to scan the NEXRAD ground radar coverage gaps in the continental US, other regions, or the world over.

Radars are conventionally used to transmit pulses and receive returns of weather ahead of the aircraft and display that information to the aircrew. The radar detects precipitation, turbulence, and wind velocity information. It also has access to other atmospheric information such as outside air temperature, winds at altitude, INS G loads (in-situ turbulence), barometric pressure, humidity, etc. That information cannot be detected over the ocean or in lesser developed countries. Therefore, detecting that information would be very valuable to industries, such as aviation, that require accurate weather information for planning and decision making It is recognized by the meteorological community that providing airborne weather sensor information to ground would provide significant improvement to weather observations and forecasts. However, before it can be properly utilized, the information must be transferred from the aircraft collecting the data to other aircraft or to ground stations.

Conventional airborne datalink communications use VHF and satellite communications (SATCOM) to transmit information between aircraft and the ground and aircraft to aircraft. There is a cost associated with installing datalink equipment on the aircraft to share data. but many aircraft are already equipped with such systems (e.g., for communication, in-flight entertainment, etc.). The primary obstacle to sharing data is the expensive costs associated with transmitting data via VHF or satellite communications. Another obstacle is the available data channel capacity or bandwidth.

There is a need for a more cost-effective system and method for communicating weather radar data between aircraft and ground radar stations. There is also a need for increasing accuracy of weather information available to ground stations and aircraft. There is further a need for improved systems and methods for communicating weather radar data between aircraft. There is further a need for improving communication with aircraft without installing additional communication hardware.

SUMMARY

One exemplary embodiment relates to a radar system having an antenna. The system includes electronics configured to facilitate communication using radar returns received and transmitted by the antenna. The electronics is configured to extract communications data from a received radar return. The electronics is further configured to provide communications data with an outgoing radar pulse for data transmission.

Another exemplary embodiment relates to a method for aircraft communication using a weather radar system having an antenna. The method includes receiving a radar return at electronics from the antenna, extracting communications data from the received radar return using the electronics, providing communications data on an outgoing radar pulse for data transmission using the electronics, and providing the outgoing radar pulse to the antenna for transmission.

Another exemplary embodiment relates to a radar system. The system includes means for receiving a radar return at electronics from the antenna, means for extracting communications data from the received radar return using the electronics, means for providing communications data on an outgoing radar pulse for data transmission using the electronics.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present disclosure will become apparent from the following description, appended claims, and the accompanying exemplary embodiments shown in the drawings, which are briefly described below.

DETAILED DESCRIPTION

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring generally to the figures, a system and method for communication between aircraft and ground stations and between aircraft using pre-existing weather radar systems is shown. Airborne weather radars, such as the Multiscan weather radar, is installed on more than 3,000 aircraft worldwide. The system can include one or more aircraft having an electronic display, a weather radar system, and electronics, where the weather radar system also functions as a communication system. Communication data can be interleaved with an outgoing radar pulse and can be extracted from a received radar pulse using current commercial weather radar hardware. The communications data may be weather-related data or non-weather-related data (e.g., communication data, status data, etc.). The reuse of existing weather radars that are already on aircraft means that no additional communication hardware is necessary beyond what is already installed for the airborne radar to receive and transmit data. In addition, there is no additional third party fee to transmit data using an airborne radar. This radar-based communication system and method can be used in addition to other communication capabilities such as SATCOM and still yield significant cost savings in data transmission costs.

Figure 1:
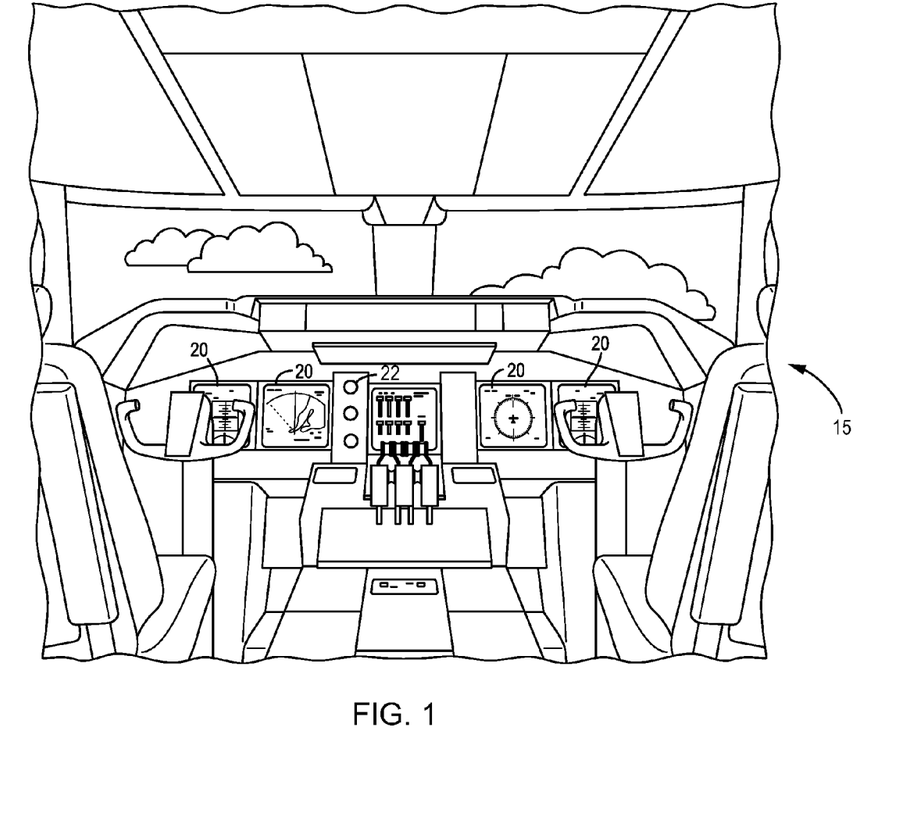
FIG. 1 is an illustration of a control center or cockpit for an aircraft, according to an exemplary embodiment.

Referring to FIG. 1, an illustration of a control center or cockpit 15 for an aircraft 10 (FIG. 3) is shown, according to one exemplary embodiment. Aircraft control center 15 includes flight displays 20. Flight displays 20 can be used to provide information to the flight crew, thereby increasing visual range and enhancing decision-making abilities. According to an exemplary embodiment, at least one of the displays of the flight displays 20 is configured to provide an indication to a flight crew as to whether the terrain features displayed on the electronic display are correct or incorrect.

In an exemplary embodiment, flight displays 20 can provide an output from a radar system of the aircraft. Flight displays 20 can include a weather display, a joint display, a weather radar map and a terrain display. Further, flight displays 20 may include an electronic display or a synthetic vision system (SVS). For example, flight displays 20 can include a display configured to display a three dimensional perspective image of terrain and/or weather information. Other view of terrain and/or weather information may also be provided (e.g. plan view, horizontal view, vertical view, etc.). Additionally, flight displays 20 can be implemented using any of a variety of display technologies, including CRT, LCD, organic LED, dot matrix display, and others. Flight displays 20 can also include head-up displays (HUD) with or without a projector.

Aircraft control center 15 additionally includes one or more user interface (UI) elements 22. UI elements 22 can include dials, switches, buttons, touch screens, or any other user input device. UI elements 22 can be used to adjust features of flight displays 20, such as contrast, brightness, width, and length. UI elements 22 can also (or alternatively) be used by an occupant to interface with or change the displays of flight displays 20. UI elements 22 can additionally be used to acknowledge or dismiss an indicator provided by flight displays 20. Further, UI elements 22 can be used to correct errors on the electronic display.

Figure 2:
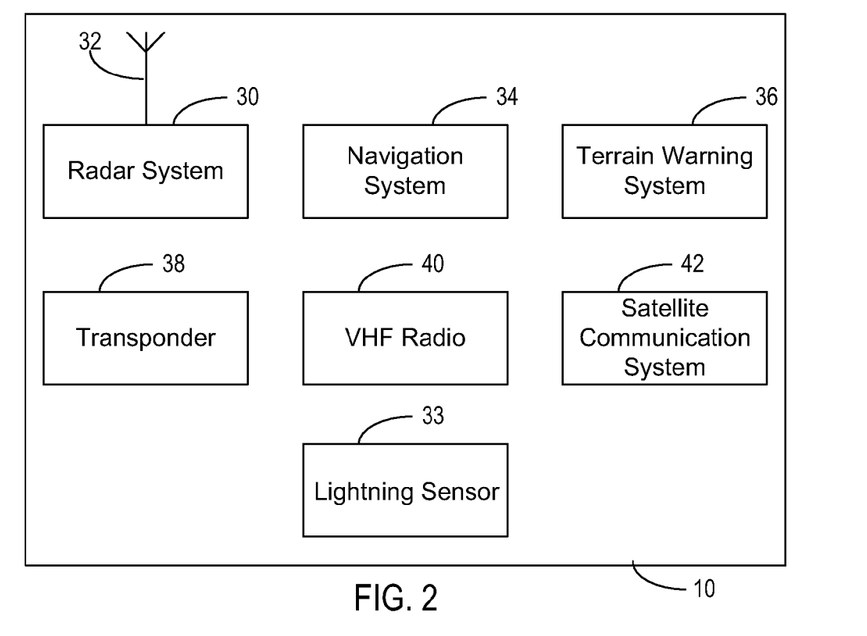
FIG. 2 is a schematic block diagram of several communication and sensor systems for an aircraft, according to an exemplary embodiment.

Referring to FIG. 2, aircraft 10 includes a radar system 30, (e.g., a weather radar system), and an antenna system 32.

Aircraft 10 may also include other communication and sensor systems such as a lightning sensor 33, a navigation system 34 (e.g., flight management system, global position system (GPS) receiver, inertial navigation system, etc.), a terrain warning system 36, a transponder 38 that is configured to transmit a signal to identify the aircraft 10 on radar systems or collision avoidance systems, a VHF radio system 40 for communications with air traffic control, and a satellite communication system 42 that is configured to provide telephone, email, internet, and other communications.

Radar system 30, via antenna system 32, is capable of casting a radar beam(s) (e.g., signal, pulse, etc.) and receiving reflective energy from weather systems, terrain, and other obstacles. Radar system 30 preferably provides the beam and receives reflectivity energy from various targets while information is accumulated in a local database and is available for processing by electronics, as detailed below. As described in more detail below, radar system 30 may also be configured to transmit communications data, such as weather-related data. The communications data may be interleaved with the radar pulses. Alternatively, the communication data may be transmitted using a dedicated datalink.

Figure 3:
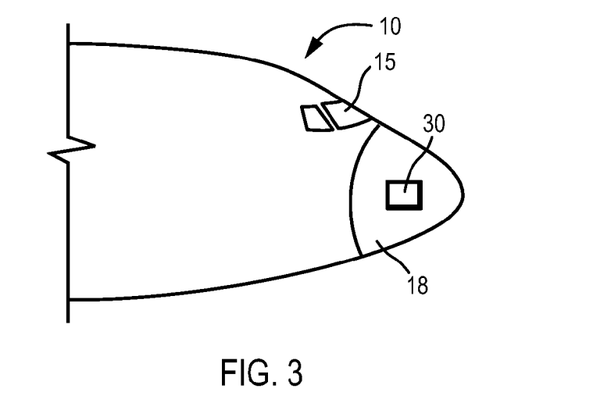
FIG. 3 is a schematic side view of the front of an aircraft with an aircraft control center and nose, according to an exemplary embodiment.

Referring to FIG. 3, the front of an aircraft 10 is shown with aircraft control center 15 and nose 18, according to an exemplary embodiment. Radar system 30 is generally located inside nose 18 of aircraft 10 or inside the cockpit 15 of aircraft 10. According to other exemplary embodiments, radar system 30 can be located on the top of aircraft 10 or on the tail of aircraft 10. Yet further, radar system 30 can be located anywhere on aircraft 10. Furthermore, the various components of radar system 30 can be distributed at multiple locations throughout aircraft 10. Additionally, radar system 30 can include or be coupled to antenna system 32.

Figure 4:
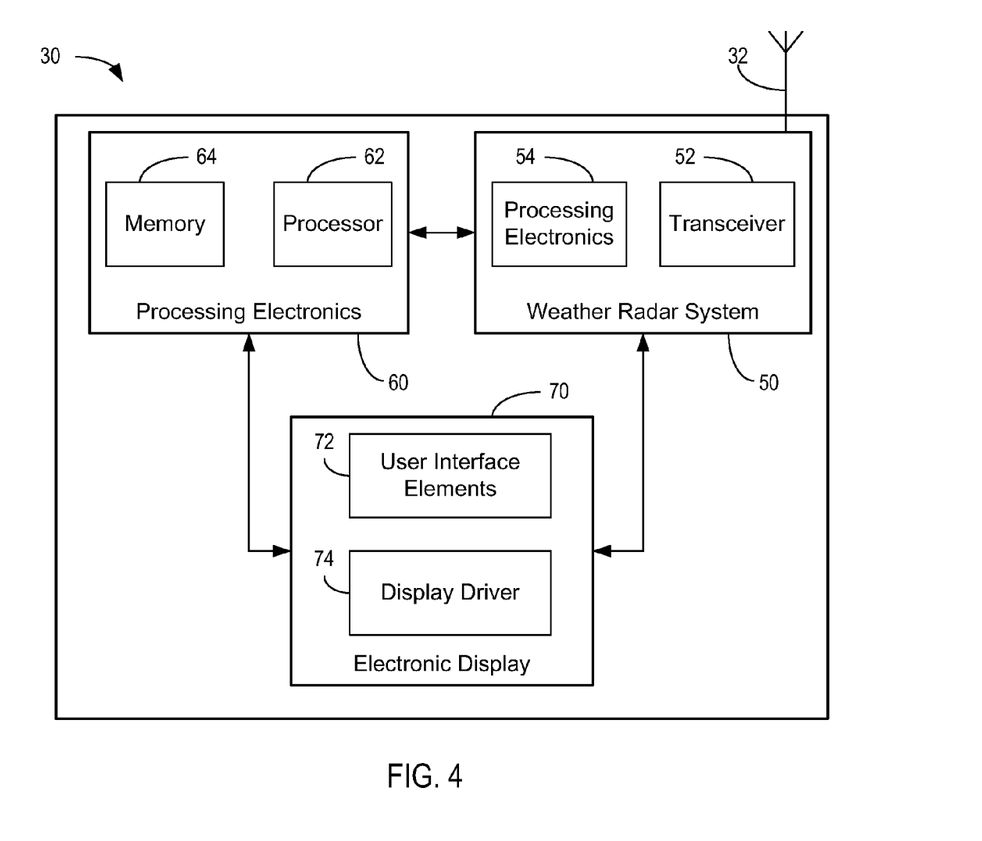
FIG. 4 is a schematic block diagram of a radar system for an aircraft, according to an exemplary embodiment.

Weather radars may be used for detecting weather (e.g., severe weather) and for providing a flight crew in an aircraft a map display showing range, bearing, and intensity of detected weather systems. Flight hazards due to weather conditions are primarily the result of precipitation and turbulence. A block diagram of a representative radar system 30 that may incorporate any embodiment in the present application is shown in FIG. 4. The radar system 30 may be a radar system manufactured by Rockwell Collins Inc., of Cedar Rapids, Iowa, or any other radar system. System 30 is shown to include a weather radar system 50, electronics 60, and an electronic display system 70. Such automatic radars may have several advantages as a source of data to fill in gap regions around ground radar sites. Automatic radars have standardized antenna patterns, standardized ground clutter rejection algorithms, and the ability to interrupt normal horizontal antenna sweeps with configurable auxiliary antenna sweeps in either elevation or in azimuth. These characteristics may be advantageously used to support the ground radar data gathering process. Also, filling in gap regions and use of aircraft sensor coverage may extend the effective range of radar data available to other aircraft. Further, the additional scans may be used to improve accuracy, threat assessment, or forecasting of the ground or airborne systems.

Pulses are transmitted from weather radar system 50 using antenna system 32 to detect weather-related flight hazards. The pulses are reflected from a target as return pulses that are received by antenna system 32 and are interpreted by radar system 50 (e.g. for display to a user, for transmission to an external weather system, etc.). Additionally, weather radar system 50 can perform multiple radar sweeps. The radar sweeps can include horizontal sweeps, vertical sweeps, or a combination of horizontal and vertical sweeps. Furthermore, the radar sweeps can be performed such that they are substantially orthogonal to one another. According to other exemplary embodiments, weather radar system 50 can be a monopulse radar system, a sequential lobing system, or a radar system with an aperture capable of switching modes.

Weather radar system 50 may be used to detect weather patterns in the vicinity of the aircraft, such as weather patterns corresponding to gaps in ground-based or airborne radar coverage. Weather radar system 50 may also be used to extend the effective range of radar data available to other aircraft or to provide radar data in regions where there is no ground coverage. Further, weather radar system 50 may provide additional scans that can be used to improve accuracy, threat assessment, or forecasting of the ground or airborne systems. Weather radar system 50 can provide weather related information to electronic display 70 and/or electronics 60. Weather radar system 50 includes an antenna 32, electronics 54, and a transceiver 52. Transceiver 52 is configured to transmit radar signals via antenna 32 and to receive radar returns via antenna 32.

Antenna 32 can be used to perform a radar sweep for detecting weather information. In addition to use for weather detection, antenna 32 can also receive return signals from ground/terrain features. The tilt of antenna 32 can be controlled thereby enabling multiple steered radar sweeps to be cast at multiple tilt angles. For example, antenna 32 may be directed specifically towards a region for communication between normal radar scans of the surrounding area. The airborne radar data collected from the radar can then be downlinked to the ground weather processing models of a weather system or to other aircraft to improve weather observations and forecasts. In some exemplary embodiments, antenna 32 may be an omni-directional antenna that transmits radar data in many directions for communication with nearby aircraft or ground stations. In other exemplary embodiments, antenna 32 may be a directional antenna that can be specifically pointed at a known or expected location of an aircraft or ground station. Directional antennas may yield a stronger communication signal and better signal-to-noise ratio.

Electronics 54 may be any hardware and/or software processor or processing architecture capable of executing instructions and processing radar returns. Any of the radar returns available to electronics 54 can be provided to electronics 60 for further processing. For example, electronics 54 may be configured to examine return data from antenna 32, thereby determining regions of weather activity. Electronics 54 may also be used to send electrical signals to antenna 32 in order to tilt antenna 32 and steer a radar sweep. Further, electronics 54 may be configured to construct a weather radar map based upon radar returns. The constructed weather radar map may be output to electronics 60 for further analysis or transmission to a ground station or to another aircraft. The constructed weather radar map may instead or may also be output to electronic display 70.

Electronics 60 may be configured to verify data received from radar system 50 or to facilitate transmission of radar data to a ground station or to another aircraft. Electronics 60 includes a processor 62 and a memory 64. Processor 62 may be any hardware and/or software processor or processing architecture capable of executing instructions (e.g., computer code stored in memory 64) and operating on various data types. Memory 64 may be any volatile or non volatile memory configured to store instructions or operations for execution by processor 62. Alternatively, memory 64 may be configured to store radar data received from returns from sweeps made by radar system 50, a ground station, or from another aircraft.

Electronics 60 may be able to determine weather or terrain types using radar range information, azimuth information, amplitude, and elevation information provided by weather radar system 50. For example, electronics 60 may determine the presence of a convective cell due to radar data indicating high reflectivity or turbulence. If the radar scan region is a ground radar gap area, electronics 60 may specifically identify the convective cell information in data transmission to a ground station or another aircraft.

Electronic display system 70 can be used to display information from weather radar system 50 or other electronic equipment. Electronic display system 70 can include user interface (UI) elements 72, display 20, and a display driver 74. Display driver 74 can be any computer hardware and/or software that enables electronic display system 70 to communicate with and receive data from various other components. UI elements 72 can be used for selection of data shown on display 20 or to apply corrections to data shown on display 20. For example, For example, UI elements 72 may be used to select specific or appropriate data corresponding to ground radar gaps for transmission to a ground station or another aircraft. Further, UI elements 72 may be used to select specific or appropriate data corresponding to additional scans that can be used to improve accuracy, threat assessment, or forecasting of the ground or airborne systems. Input received from UI elements 72 is processed by display driver 74. Display driver 74 may then communicate the received input to electronics 60 or various other components. Display system 70 may provide improved weather threat information or forecast information to the crew as well as a recommendation on actions to take (e.g., deviate from flight plan, make new flight plan, etc.).

Data collected by radar system 50 can be communicated between aircraft 10 and radar ground stations or other aircraft. According to a preferred embodiment, radar system 30 is utilized as a communication system. In addition to detecting weather-related flight hazards emitting signals and receiving and interpreting the return signals, the radar system 30 can also be used to communicate with other aircraft, ground stations, or any other vehicles or buildings equipped with a radar system. The data transmission capability can be interleaved with the current weather detection process, using current commercial weather radar hardware.

Weather-related radar data is sent out and collected in pulses. The United States Federal Aviation Administration (FAA) requires that at least two radar sweeps be made every 20 seconds, and any displays (e.g., display 20) be updated or refreshed accordingly. There is therefore time during radar sweeps to process, transmit, and receive data, such as weather-related data, between aircraft and ground stations between radar sweeps. Electronics associated with radar system 30 (e.g., electronics 54, electronics 60, etc.) may be used to coordinate the transmission of weather-related data and synchronize the outgoing radar pulse at a time that aircraft along the flight path or airway are expecting communication data.

To differentiate the weather-related data from the detection radar pulses, the data may be processed by electronics associated with radar system 30 (e.g., electronics 54, electronics 60, etc.) using an identifiable coding protocol that allows information to be extracted (e.g., a differential base coding protocol). Using a coding protocol, information is transmitted by changing the phase of the carrier signal. Differential coding may provide superior error performance and protection against phase ambiguity. Differential coding compares the phase between two consecutive received signals and thus verifies the integrity of the received data. In other exemplary embodiments, other methods of communications may be used including BPSK (Binary Phase Shift Keying), QPSK (Quadrature Phase Shift Keying), QAM (Quadrature Amplitude Modulation), etc. The auxiliary data may be transmitted and received between aircraft 10 and a ground station or another aircraft along with or between detection radar pulses. The auxiliary data may be transmitted using a single, low-power transmitter as a continuous wave output.

To transmit the weather-related data, airborne radar system 30 is modified with a data transmission protocol to transmit and receive data. Existing protocols, such as those used by systems such as traffic collision and avoidance systems (TCAS) and other transponders may be used to manage data transmissions between radar systems. According to an exemplary embodiment, transmission rates between radar systems range between 4 Mb/s-10 Mb/s. There is an expected high signal-to-noise ratio when radar systems (e.g., radar system 30 and a corresponding radar system associated with a ground station or another aircraft) are pointing at each other and transmitting energy. The high signal-to-noise ratio allows for the detection or identification of a data transmission signal from background noise or regular radar returns. The signal to noise ratio may also be used to locate another nearby radar. In other embodiments, the positions of other radar systems may already be known.

A radar-based communications system is advantageous in several ways compared to other existing communication systems common on aircraft. Transponder 38 can also be used to transmit and receive information. However, the primary purpose of transponder 38 is to relay location and identification data of aircraft 10. Transponder 38 typically operates at very narrow bandwidth, around 1 GHz. Because there is a limited bandwidth, the size and frequency of signals to and from transponder 38 is limited. There is ample bandwidth in the frequency range at which radar operates. According to an exemplary embodiment, the frequency of the data signal transmitted using radar system 30 is generally higher than 1 GHz, but can be any frequency.

Data transmissions via radar system 30 do not incur additional transmission or subscription fees. Datalink messages using VHF systems 40 or SATCOM systems 42 can incur associated, third-party costs.

Figure 5:
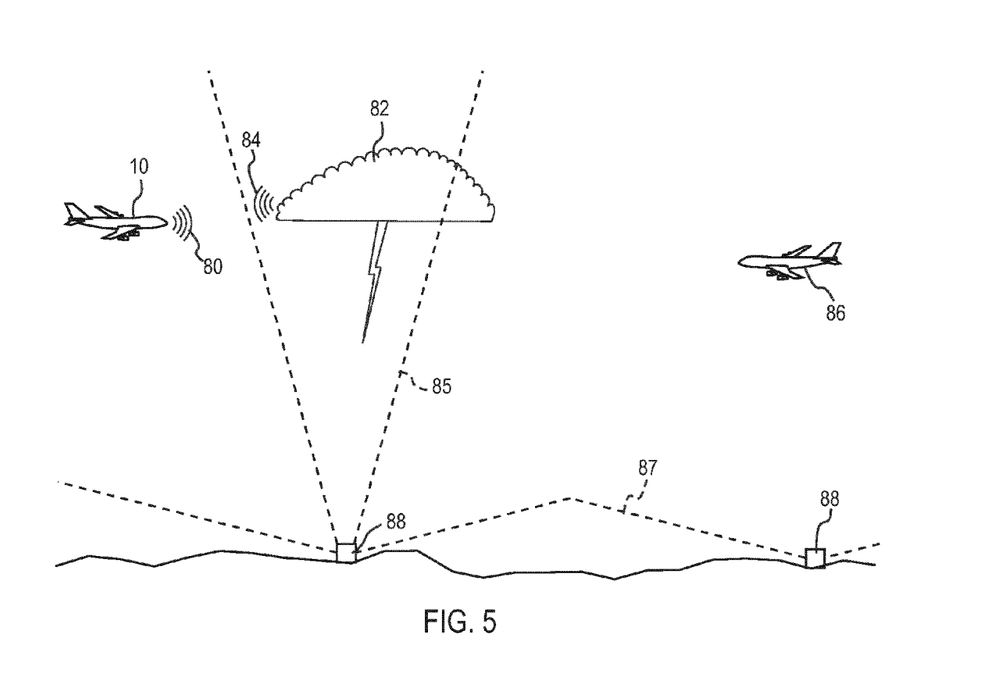
FIGS. 5-7 are illustrations of aircraft-to-aircraft radar communication and aircraft-to-ground radar communication according to some exemplary embodiments.
Figure 6:
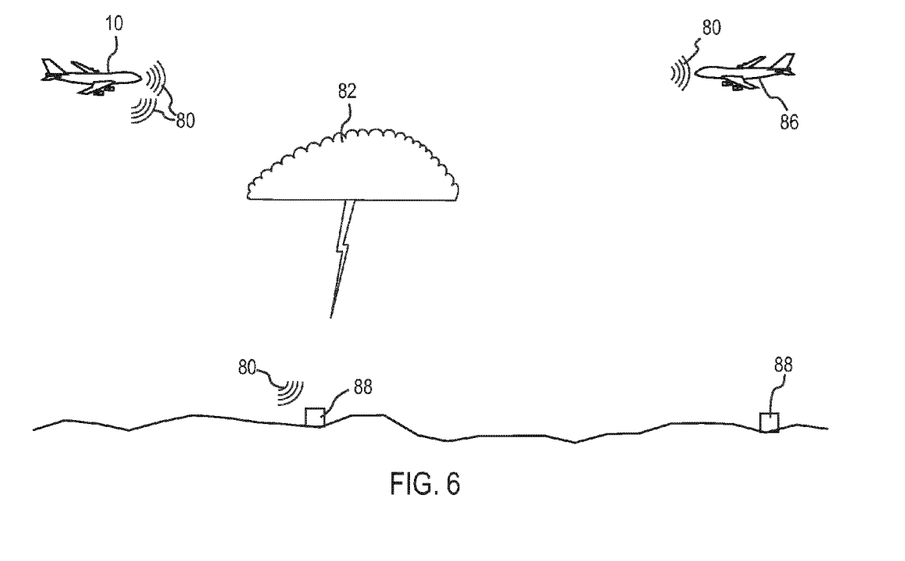
Figure 7:
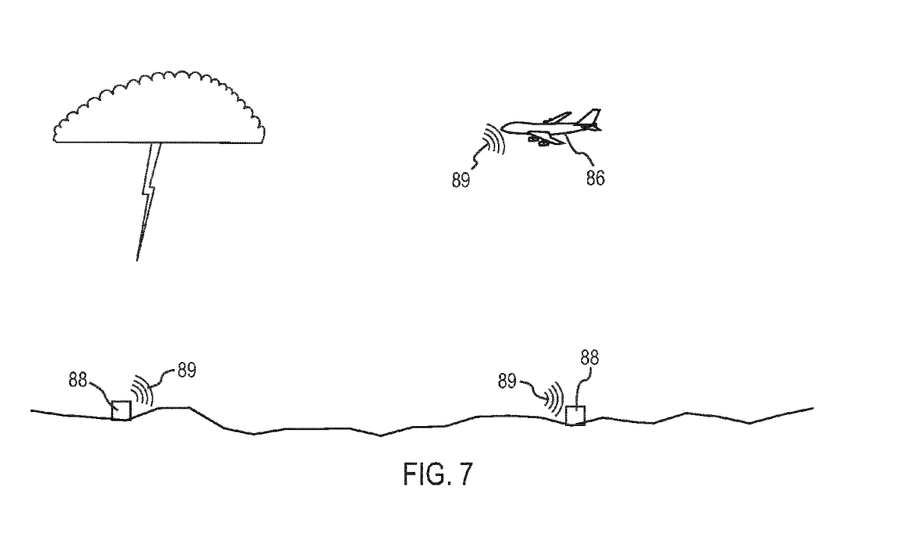

Referring now to FIGS. 5-7, a scenario involving aircraft 10 communicating using radar system 30 is shown according one exemplary embodiment. As shown in FIG. 5 and described above, aircraft 10 uses radar system 30 to transmits a radar pulse 80. Radar pulse 80 reflects off a target 82 (e.g., another aircraft, a weather system, terrain, etc.), and a reflected radar pulse 84 is received by aircraft 10. The reflected radar pulse 84 is analyzed by radar system 30 to collect information about target 82.

As shown in FIG. 6, aircraft 10 may coordinate with other aircraft 86, and/or ground stations 88 to transmit collected data using a subsequent radar pulse 80 transmitted from radar system 30. The transmitted data signal in radar pulse 80 may comprise weather-related data, such as turbulence, reflectivity, wind, temperature, barometric pressure, humidity, lightning, navigation, terrain data, derived weather threat data (e.g., vertically integrated liquid data, eddy dissipation rate, etc.), or other data collected by radar system 30 or other instruments or sensors.

Aircraft 10 and aircraft 86 may communicate weather-related data, such as data collected about a target 82 (e.g., a weather system). For example, if aircraft 10 and aircraft 86 are traveling along generally opposing vectors, aircraft 10 may have previously passed weather systems that aircraft 86 will encounter later. Aircraft 10 may communicate data related to weather systems along the flight path of aircraft 86 to facilitate a more accurate prediction of the weather systems and allow aircraft 86 to plan a flight path. Aircraft 10 may generate a threat information or forecast and communicate the threat assessment or forecast to other aircraft or ground stations.

Aircraft 10 may also communicate weather-related data to ground stations 88. Ground stations 88 can be equipped with omni directional receivers to receive transmissions from aircraft flying enroute and within approximately 300 nautical miles of the ground station 88. For example, aircraft 10 may transmit a data signal via radar pulse 80 to ground station 88 related to a weather system that is undetected by ground station 88. Ground radar systems are configured to scan the atmosphere for weather data. These ground radar systems (e.g., ground station 88) are generally incapable of scanning directly overhead because of the maximum tilt elevation of the radar. This area includes a gap where no data is collected called a cone of silence 85. Multiple ground radar systems 88 spaced at various intervals may be used to increase coverage of the atmosphere. Radar scans of multiple systems generally intersect or overlap at some distance and elevation from radar station 88. Because the ground radar sweeps or scans have a minimum angle in which they can scan, a gap is generated beneath the lowest elevation of the ground radar scans and extending up to a point in which the scans intersect. This gap is called an umbrella of silence 87. Other gaps may exist in ground radar sweeps, for example gaps generated because of terrain obstruction such as from mountains. By transmitting a weather-related data signal via radar pulse 80 using radar system 30, aircraft 10 can help to complete gaps in the ground radar system and improve tracking and analysis capabilities.

As shown in FIG. 7, the ground station 88 may further processes the information with weather forecasting models. That forecast model data may then be transmitted via a radar pulse 89 to a nearby aircraft 86 that is equipped with an airborne radar or to another ground station 88 (e.g., via aircraft passing overhead).

Figure 8:
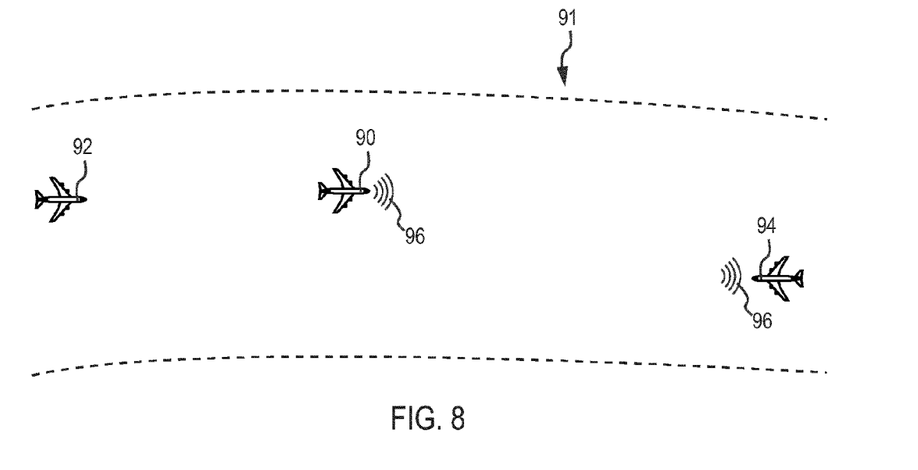
FIGS. 8 and 9 are illustrations of data being transferred between aircraft travelling along an air corridor, according to an exemplary embodiment.
Figure 9:
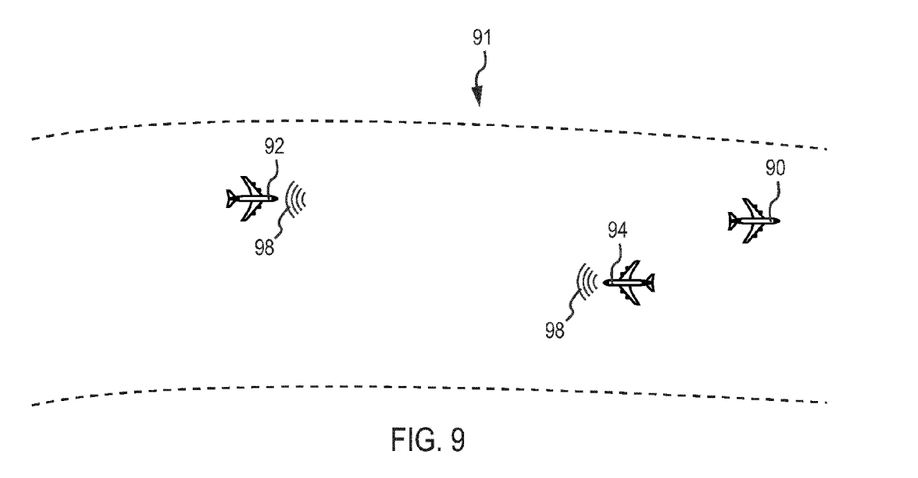

Referring now to FIGS. 8 and 9, a scenario is illustrated involving several aircraft along a flight corridor 91 (e.g. air corridor, airways, etc.) forming a communication network using radar system 30, according to one exemplary embodiment. Because radar systems 30 are typically located in the nose 18, communication may not be able to be made directly from a first aircraft 90 to a second aircraft 92 trailing behind first aircraft 90. First aircraft 90 may transmit a signal interleaved with a radar pulse 96 containing weather-related data to a third aircraft 94 travelling along a different vector. Similar to packet radio signals, the signal interleaved in pulse 96 may be encoded with additional information, such as the identification of the intended receiver, the identification of the sender, and the route between the two, along with data and error checking to maintain the accuracy of the data. Third aircraft 94 stores the data using electronics associated with radar system 30 (e.g., electronics 54, electronics 60, etc.), and retransmits a pulse 98 containing the weather-related data to second aircraft 92. This information may then continue to be relayed to other aircraft or ground stations.

Figure 10:
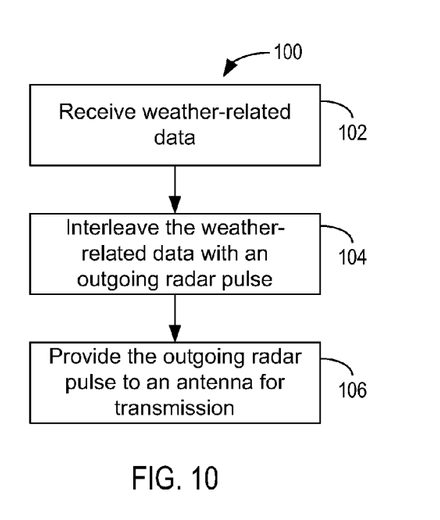
FIG. 10 is a process flow diagram of a method for transmitting data using a radar-based communication system, according to an exemplary embodiment.

Referring now to FIG. 10, a method 100 of sending an outgoing aircraft communication using a weather radar system having an antenna is illustrated according to an exemplary embodiment. Aircraft 10 receives data, such as weather-related data (e.g., turbulence, reflectivity, wind, temperature, barometric pressure, humidity, lightning, navigation, terrain data, derived weather threat data (e.g., vertically integrated liquid data, eddy dissipation rate, etc.) or other data collected by radar system 30 or other instruments or sensors) using weather radar 50 or other sensors that is to be communicated (step 102). Radar system 30 interleaves the weather data with an outgoing radar pulse for data transmission using the electronics (e.g., electronics 54, electronics 60, etc.) (step 104). Radar system 30 then provides the outgoing radar pulse to antenna 32 for transmission (step 106). A similar method may be used by a ground-based radar installation to communicate data with aircraft or other ground stations. Aircraft 10 may also receive safety information such as alerts and traffic information for external sources and from the ownship. Similarly, the safety information may be combined with the outgoing radar pulse for transmission.

Figure 11:
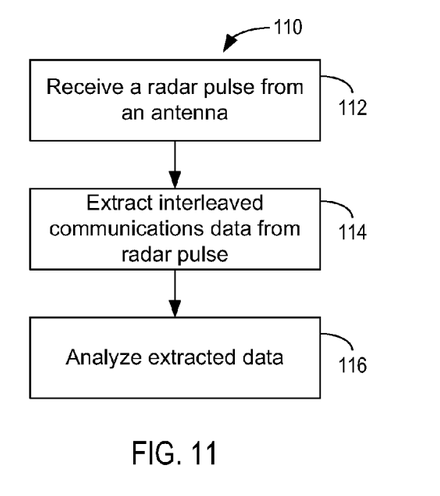
FIG. 11 is a process flow diagram of a method for receiving data using a radar-based communication system, according to an exemplary embodiment.

Referring now to FIG. 11, a method 110 of receiving an incoming aircraft communication using a weather radar system having an antenna is illustrated according to an exemplary embodiment. Aircraft 10 receives a radar signal at electronics (e.g., electronics 54, electronics 60, etc.) from antenna 32 (step 112). Radar system 30 extracts weather data interleaved in the received radar return using the electronics (step 114). Weather data is analyzed by the electronics and may be utilized to augment existing data collected by aircraft 10 (step 116). For example, the weather data may be utilized to update radar maps for output to the flight crew using displays 20. The weather data may be used to generate 3-D weather maps and/or 4-D weather maps or forecasts. A similar method may be used by a ground-based radar installation to utilize data from aircraft.

Figure 12:
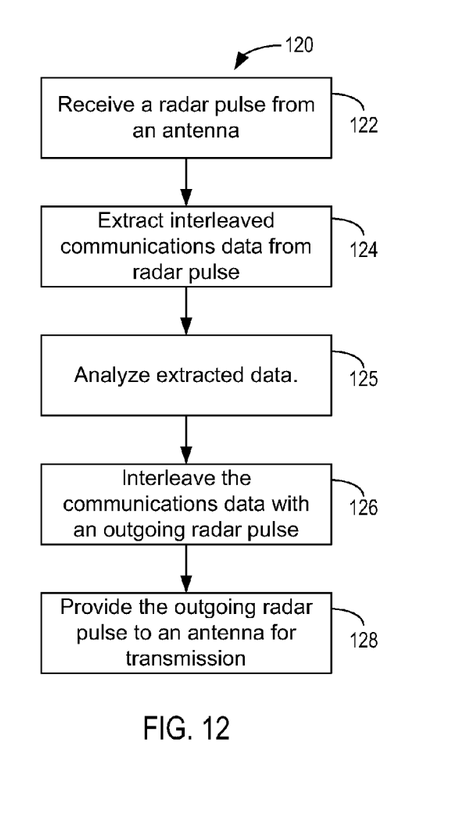
FIG. 12 is a process flow diagram of a method for relaying data using a radar-based communication system, according to an exemplary embodiment.

Referring now to FIG. 12, a method 120 of receiving and retransmitting an aircraft communication using a weather radar system having an antenna is illustrated according to an exemplary embodiment. Aircraft 10 receives a radar return at electronics (e.g., electronics 54, electronics 60, etc.) from antenna 32 (step 122). Radar system 30 extracts weather data interleaved in the received radar return using electronics (step 124). The extracted data is analyzed by the electronics (step 125). The weather data may be utilized to augment existing data collected by aircraft 10 or may be stored for retransmission to another aircraft. If the data is to be retransmitted, radar system 30 interleaves the weather data with an outgoing radar pulse for data transmission using the electronics (step 126). Radar system 30 then provides the outgoing radar pulse to antenna 32 for transmission (step 128). A similar method may be used by a ground-based radar installation to communicate data with aircraft.

Coupling the radar with networking technologies for self-organizing mobile networks, aircraft with radars can act as mobile network communication nodes that can transmit and receive data. A radar in a mobile network may re-transmit data received from another aircraft, and thereby be used as a repeater in the network. The re-transmission of data using the weather radar extends the range of communication to cover oceanic flight routes. The communication network formed by the aircraft communicating using radar systems 30 may be an effective means of sharing remotely sensed turbulence information between aircraft flying en-route over the ocean or over underdeveloped countries.

The reuse of existing radar systems 30 that are already on aircraft means that no additional communication hardware is necessary beyond what is already installed for the airborne radar 30 to receive and transmit data. In addition, there is no additional third party fee to transmit data using an airborne radar 30. Communications may be made directly between aircraft 10 and a ground station or another aircraft communication, or may be routed via one or more satellites or other third party relays within the line of sight of the aircraft. Radar-based communication may be used in combination with other communication means such as transponder 38, VHF radio 40, satellite communications system 42, or radar system 30. Radar-based transmission could be used in addition to other communication capabilities such as satellite communications and still yield significant cost savings in data transmission costs. Further, in some cases, satellites available for communication may be sparse or may drop out from availability. In other cases, satellite channel capacity may be at its maximum because of the satellite channel capacity and availability. In these cases where satellite communication not available, radar based communication may be used instead.

While the exemplary embodiments described above generally interleave communications data within a radar pulse, in other exemplary embodiments, radar system 30 or 50 may be modified to include a dedicated datalink. For example, radar system 30 or 50 may include at least one dedicated communication channel to transmit and receive information using the radar platform. In such exemplary embodiments, the communications data may not need to be interleaved with normal radar operation.

While the description with respect to the figures generally discusses communication of weather-related data, in other exemplary embodiments, non-weather-related data may be transmitted and received. For example, aircraft location information and/or flight plan information may be communicated via a radar system. Such flight plan information may include trajectory, speed, heading, etc. Communication of such location and flight plan information via a radar system may be used instead of a conventional Automatic Dependent Surveillance Broadcast (ADSB) to alert other aircraft and ground stations to aircraft locations, status, and intent.

Exemplary embodiments may include program products comprising computer or machine-readable media for carrying or having machine-executable instructions or data structures stored thereon. For example, aircraft radar system 30 may be computer driven. Exemplary embodiments illustrated in the methods of FIGS. 10-12 may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present invention could be accomplished with standard programming techniques with rule based logic and other logic to accomplish the various connection steps, processing steps, comparison steps and decision steps.

It is also important to note that the construction and arrangement of the components as shown in the various exemplary embodiments is illustrative only. Although only a few embodiments have been described in detail in this disclosure, those skilled in the art who review this disclosure will readily appreciate that many modifications are possible (e.g., variations in dimensions, structures, shapes and proportions of the various elements, mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions as expressed in the appended claims.

What is claimed is:

1. A weather radar system having a transceiver and an antenna, comprising:
   electronics configured to facilitate communication using the transceiver and the antenna, the electronics configured to extract communications data from a received communication radar signal received by the antenna and provided by the transceiver to the electronics, the electronics further configured to provide the communications data for an outgoing radar signal for data transmission via the transceiver and the antenna, wherein the weather radar system actively detects in an area weather by providing outgoing radar pulses from the transceiver to the antenna and receiving radar returns using the transceiver and the antenna, wherein the weather radar system steers the antenna to perform a weather radar scan including the outgoing radar pulses and the outgoing radar signal, wherein during the weather radar scan, the antenna is steered towards a communication region for communication in the area; wherein the outing radar signal uses differential coding, the differential coding comparing phase between two consecutively received signals to verify integrity of the communications data.

2. The radar system of claim 1, wherein the electronics extracts the communications data interleaved with the communication radar signal and provides the communications data interleaved with the outgoing radar signal, wherein the area is along the flight path of an aircraft.

3. The radar system of claim 2, wherein the electronics interleaves the communications data into the outgoing radar signal using an identifiable coding protocol that allows information to be extracted.

4. The system of claim 1, wherein the electronics provides a dedicated datalink for transmitting and receiving the communications data via the weather radar system, wherein a time slot for provision of the outgoing radar signal is synchronized with at least one aircraft, the time slot being during the weather radar scan.

5. The radar system of claim 1, wherein the received communication radar signal is received from at least one of an aircraft and a ground station and wherein the outgoing radar signal is transmitted to at least one of an aircraft and a ground station, wherein the communications data includes weather data associated with a cone or umbrella of silence associated with the ground station.

6. The radar system of claim 5, wherein the electronics is configured to retransmit data received on the received communication radar signal.

7. The radar system of claim 5, wherein weather radar systems located on a plurality of aircraft are configured to form a communication network.

8. The radar system of claim 1, wherein the outgoing radar signal is transmitted along a known flight path or an airway.

9. The radar system of claim 8, wherein the electronics synchronizes the outgoing communication radar signal at a time that aircraft along the flight path or airway are expecting communication data.

10. The radar system of claim 1, wherein the communications data comprises at least one of turbulence, reflectivity, wind, temperature, barometric pressure, humidity, lightning, navigation, position, flight plan, terrain, vertically integrated liquid, eddy dissipation rate, forecast, and threat assessment data.

11. The radar system of claim 1, wherein the outgoing communication radar signal comprises an auxiliary data scan between radar pulses configured to detect weather.

12. The radar system of claim 1, wherein the communications data is at least one of displayed, used to modify a flight plan, used to modify aircraft performance, and used to make a recommendation of an action.

13. A method for communication using a weather radar system having an antenna, the method comprising:
   receiving a radar return at electronics from a transceiver coupled to the antenna;
   extracting communications data from the received radar return using the differential coding at the electronics;
   providing communications data for an outgoing radar pulse for data transmission using the electronics; and
   providing the outgoing radar pulse to the antenna via the transceiver for transmission, wherein the outgoing radar pulse is provided during a weather radar scan in an area, wherein the antenna is steered to a communication region in the area of the weather radar scan when the outing radar pulse is provided.

14. The method of claim 13, wherein the extracted data is interleaved with the received radar return and the provided data is interleaved with the outgoing radar pulse.

15. The method of claim 13, wherein the communication data is transmitted and received by a dedicated datalink of the radar system.

16. The method of claim 13, wherein the received radar return is received from at least one of an aircraft and a ground station and wherein the outgoing radar pulse is transmitted to at least one of an aircraft and a ground station, wherein a time slot for provision of the outgoing radar signal is synchronized with the at least one other aircraft, the time slot being during the weather radar scan.

17. The method of claim 16, further comprising: retransmitting data received on the received radar return using the electronics.

18. The method of claim 17, further comprising: synchronizing the outgoing radar pulse at a time that aircraft along the flight path or airway are expecting communication data using the electronics.

19. The method of claim 13, wherein the communications data comprises at least one of turbulence, reflectivity, wind, temperature, barometric pressure, humidity, lightning, navigation, position, flight plan, terrain, vertically integrated liquid, eddy dissipation rate, forecast, and threat assessment data.

20. The method of claim 13, wherein the outgoing radar pulse comprises an auxiliary data scan between radar pulses configured to detect weather.

21. The method of claim 13, wherein the communications data is provided to a ground station, the communication data reading including weather data, the weather data being associated with a cone of silence of the ground station.

22. A weather radar system, comprising:
   means for receiving a radar return at electronics using a transceiver coupled to the antenna;

means for extracting communications data from the received radar return using the electronics, wherein the communications data is extracted using differential coding, the differential coding comparing phase between two consecutive received returns;

means for providing communications data on an outgoing radar pulse for data transmission using the electronics, wherein the outgoing radar pulse is provided during a weather radar scan, wherein the antenna is steered to a communication region in an area of the weather radar scan when the outing radar pulse is provided.

\* \* \* \* \*